July 14, 1931.  J. W. WOODRUFF  1,813,982

CUT-OFF VALVE

Filed March 6, 1929

INVENTOR
Joseph H. Woodruff,
BY
Everett Cook,
ATTORNEYS

Patented July 14, 1931

1,813,982

UNITED STATES PATENT OFFICE

JOSEPH W. WOODRUFF, OF ELIZABETH, NEW JERSEY

CUT OFF VALVE

Application filed March 6, 1929. Serial No. 344,680.

This application is a continuation in part of my copending application Serial No. 200,532 filed June 22, 1928, and relates to a cut-off valve or outlet valve for use particularly with grease pumping apparatus such as described in my said copending application, wherein grease is discharged through the outlet valve under high pressure from a reservoir through a pipe or tube to which the outlet valve embodying the present invention is connected.

One object of this invention is to provide such a cut-off or outlet valve whereby lubricant or other liquid or semi-liquid can be constantly maintained at a uniform high pressure at the valve and at the same time permit the valve to be easily and quickly manually operated.

Another object is to provide such a valve which is closed by the lubricant pressure and includes novel and improved means whereby the valve can be easily manually opened by the simple swinging of a handle or lever. Other objects are to provide a valve of the character described including novel and improved means for positively holding said valve open against the pressure of the lubricant or other liquid; to provide such a valve including a ball check which closes in the direction of movement of the liquid through the valve and under pressure thereof, and manually operated means for unseating the ball check to permit flow of the liquid through the valve; to provide such a valve which is small and compact in construction and strong and durable in operation, and to obtain other advantages and results as will be brought out by the following description.

Figure 1:
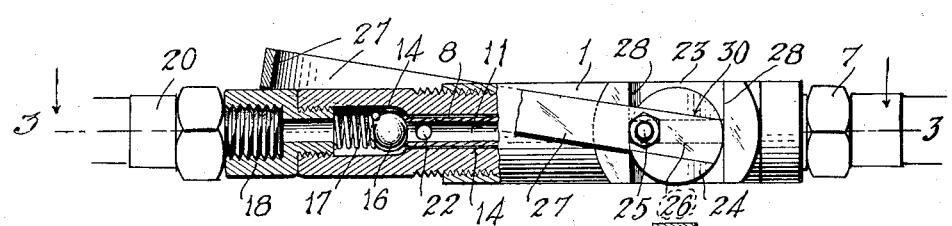

Referring to the acompanying drawings, in which corresponding and like parts are designated throughout the several views by the same reference characters, Figure 1 is a sectional side elevation of a valve embodying my invention showing the parts of the same in the position to permit flow of liquid therethrough.

Figure 2:
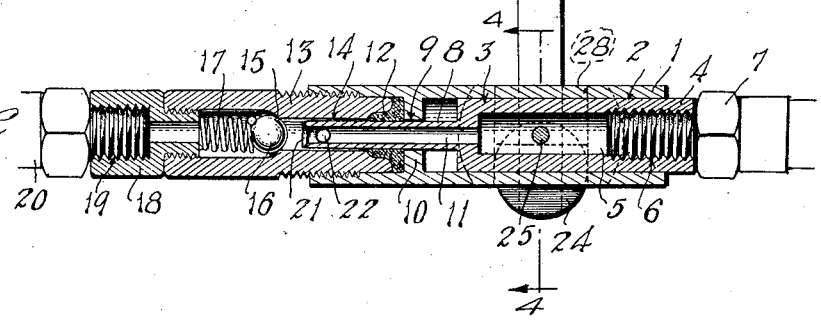
Figure 3:
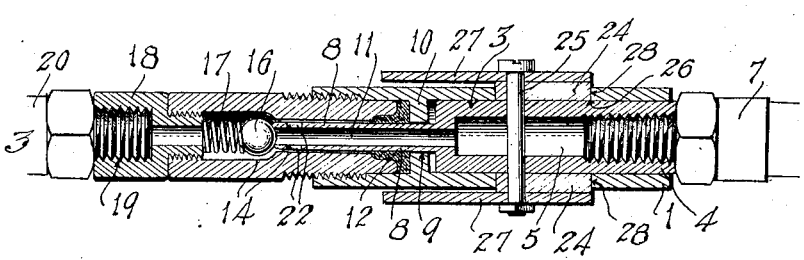
Figure 4:
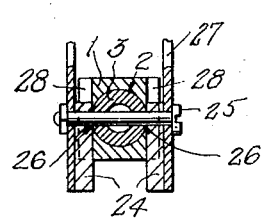

Figure 2 is a vertical longitudinal sectional view through the valve showing the parts in the position for cutting off the flow of liquid through the valve, Figure 3 is a horizontal sectional view taken on the line 3—3 of Figure 1, and Figure 4 is a transverse sectional view on the line 4—4 of Figure 2.

Specifically describing the illustrated embodiment of my invention, the valve consists of a main casing 1 which has a cylindrical bore 2 extending inwardly from one end thereof and in which is slidable a plunger 3 having a main portion 4 to nicely fit the bore 2 and formed with a longitudinal passage 5 to the outer end of which may be connected as by screw thread 6 a tube or any other suitable part 7 through which lubricant is to be supplied. The end of the plunger 3 to which the tube 7 is connected projects outwardly beyond the end of the casing 1. At its inner end the plunger 3 is provided with a reduced portion 8 which is slidable through an opening 9 in a partition 10 intermediate the ends of the casing 1, said reduced portion also having a longitudinal passage 11 for communication with the passage 5 in the portion 4 of the plunger.

At the side of the partition 10 opposite the portion 4 of the plunger is arranged a packing ring 12 which tightly surrounds the reduced portion 11 of the plunger to form a liquid-tight joint therewith. This packing ring is held in position by the end of a nipple 13 which is screw-threaded into the end of the casing 1 opposite the plunger 3. This nipple has a longitudinal passage 14 in axial alinement with the passage 11 through the reduced portion 8 of the plunger, and a valve seat 15 is provided in the passage 14 to cooperate with a ball 16 which is normally held in engagement with said seat by a spring 17. This spring is held in position by a tubular plug 18 screw-threaded into the end of the nipple 13, and the plug 18 is formed at its outer end with means such as the screw threads 19 for connection with a tube 20 or other part through which liquid is to be supplied.

The extremity of the reduced portion 8 of the plunger is formed with a cupped seat 21 to engage the ball 16, and transverse by-pass openings 22 are formed in said reduced portion to permit passage of liquid therethrough.

With this construction it will be observed that the casing 1 and plunger 3 are relatively reciprocable and when the plunger is moved inwardly of the bore 2 of the casing the extremity of the reduced portion 8 engages the ball 16 so as to force the latter from its seat as shown in Figure 3 of the drawings, while when the plunger moves in the other direction said ball is released by the plunger and closed by the pressure of the liquid and the spring 17. The liquid from the inlet tube 20 flows through the plug 18 past the valve seat 15 into the valve nipple 13 and thence through the by-pass openings 22 into the plunger 3, from whence the liquid flows into the outlet tube 7. The packing ring 12 prevents leakage of the liquid around the reduced portion 8 of the plunger into the bore 2.

For causing the relative reciprocation of the casing and the plunger I may provide substantially rectangular recesses 23 in opposite sides of the casing 1 and arrange in each thereof a circular disc 24 which is eccentrically connected to the plunger 3 by a bolt 25 which passes through slots 26 extending longitudinally of the casing in a diametral plane thereof at the bases of the recesses 23. The diameter of the discs 24 is the same as the width of the recesses 23. The bolt 25 connecting the discs 24 to the plunger 3 also serves to connect to the discs the respective arms of a substantially U-shaped handle 27 which serves to rotate the discs. Preferably each disc has a transverse groove 30 in which is seated the corresponding arm of the handle to provide a rigid connection of the handle to the disc.

It will be clear from the foregoing that oscillation of the handle 27 will cause rotation of the discs 24, which through their eccentric connection to the plunger 3 and engagement with the side walls 28 of the recesses 23 will cause relative reciprocation of the casing 1 and the plunger 3. It should be further noted that this operating mechanism for the valve, due to the cam action of the discs 24 and walls 28 of the recesses 23 when the handle 27 is rotated into the position to locate the axis of the bolt 25 and the points of engagement of the cam discs 24 with the side walls of the recesses in substantially an axial plane of the casing 1, will serve to positively hold the valve 16 in open position against the pressure of the liquid, as shown in Figure 1 of the drawings. The casing serves as a stop to limit movement of the handle beyond this position. The engagement of the cam discs 24 with the side walls of the recesses also enables easy opening of the valve against the high pressure of the liquid, and permits easy closing of the valve by said pressure when the dead center relation of the bolt 25 with the points of engagement of the cam discs 24 with the side walls of the recesses in the axial plane of the casing 1 is disturbed by swinging of the handle 27 upwardly away from the valve casing 1.

The construction also permits of discharge of liquid through the valve in small quantities or spurts; by grasping the casing in one hand and alternately quickly pressing down upon and releasing the handle 27 with the thumb, the ball valve 16 can be easily and quickly and repeatedly opened and closed.

It should also be noted that upon closing of the ball valve 16 the plunger moves outwardly producing a partial vacuum between the valve and the inner end of the plunger, and this action causes the liquid or grease in the outlet tube 7 to be sucked back into the casing so as to prevent waste of the grease or liquid and maintain the end of the outlet tube free of grease or liquid.

I am aware of such structures as shown by Patents Nos. 704,230 and 672,835, and do not desire to be understood as attempting to claim such devices. However, while I have shown and described my invention as embodying certain details of construction it will be understood that this is primarily for the purpose of illustrating the principles of the invention and that many modifications and changes may be made by those skilled in the art without departing from the spirit or scope of the invention.

Having thus described my invention, what I claim is:

1. A valve device comprising a casing having an inlet port controlled by an outwardly closing valve, a plunger reciprocable in said casing and having an outlet passage communicating at its inner end with said inlet port, said plunger engaging said valve to open the valve as the plunger moves inwardly of the casing and said valve closing as the plunger moves outwardly, a cam pivoted upon said plunger and bearing upon said casing, and means for rotating said cam, whereby upon rotation of said cam relative reciprocation of said casing and said plunger is produced to open and close said valve.

2. A valve device comprising a casing having an inlet port controlled by an outwardly closing valve, a plunger reciprocable in said casing and having an outlet passage communicating at its inner end with said inlet port, said plunger engaging said valve to open the valve as the plunger moves inwardly of the casing and said valve closing as the plunger moves outwardly, said casing having a recess, a cam engaging opposite side edges of said recess, means pivotally connecting said cam to said plunger, and means for rotating said cam, whereby upon rotation of said cam relative reciprocation of said casing and said plunger is produced to open and close said valve.

3. A valve device comprising a casing having a longitudinal bore therethrough with an inlet port at one end, an outwardly closing valve controlling said port, a plunger reciprocable in said bore and having a longitudinal outlet passage communicating at its inner end with said inlet port said casing having a pair of alined recesses in opposite sides thereof, a circular disc arranged in each of said recesses with its edges engaging the side edges of the respective recess, means pivotally connecting said discs coaxially and eccentrically upon said plunger, and means for simultaneously rotating said discs, whereby upon rotation of said discs relative reciprocation of said casing and said plunger is produced to open and close said valve.

4. A valve device comprising a casing having a bore opening through one end thereof and an inlet passage at the other end, a plunger reciprocable in said bore and having an outlet passage therethrough communicating at its inner end with said inlet passage, an outwardly closing valve controlling said inlet passage and arranged to be opened by engagement therewith of the inner end of the plunger upon reciprocation of the latter, said casing having recesses at diametrically opposite sides thereof, a cam disc arranged in each of said recesses with its edges engaging the sides of the recess, means pivotally connecting said cam discs to said plunger, and a U-shaped handle in straddling relation to said casing with each of its arms connected to one of said discs for simultaneously rotating both said discs.

5. A valve device comprising a casing having a bore opening through one end thereof and an inlet passage at the other end, a plunger reciprocable in said bore and having an outlet passage therethrough communicating at its inner end with said inlet passage, an outwardly closing valve controlling said inlet passage and arranged to be opened by engagement therewith of the inner end of said plunger upon reciprocation of the latter, said casing having recesses at diametrically opposite sides thereof a cam disc arranged in each of said recesses with its edges engaging the sides of the recess, means pivotally connecting said cam discs to said plunger, and a U-shaped handle in straddling relation to said casing with each of its arms connected to one of said discs for simultaneously rotating both said discs the handle being so related to the pivotal connection of said discs with said plunger so as to bring said pivotal connection and the points of engagement of said discs with the sides of respective recesses into an axial plane of said plunger so as to lock said plunger in valve opening position.

6. The valve set forth in claim 5 wherein said casing serves as a stop for said handle to prevent movement of said plunger in one direction beyond said valve opening position.

7. The valve set forth in claim 1 with the addition of a spring for closing said valve head.

8. The valve set forth in claim 4 wherein the inner end of said plunger has transverse passages for establishing communication between said inlet passage and the outlet passage in said plunger.

9. A valve device comprising a casing having a bore opening through both ends thereof and a partition in said bore, a plunger reciprocable in said bore and having an outlet passage therethrough, a packing ring abutting said partition in said casing and surrounding said plunger, a nipple screw threaded into one end of the bore against said packing ring to hold the latter in position, said nipple having an inlet port receiving one end of said plunger and communicating with said outlet passage in said plunger, an outwardly closing ball valve for controlling said inlet port, a spring for forcing said ball valve into closed position, the inner end of said plunger engaging said ball valve to open the valve as the plunger moves inwardly of said casing, a tubular inlet plug screwed into said inlet port and engaging the inner end of said spring to hold the latter against said ball valve, said plug being formed to be connected to a liquid supply, and means for causing relative reciprocation of said plunger and said casing in the direction to open said valve.

JOSEPH W. WOODRUFF.